A. WAGNER.
DIRIGIBLE HEADLIGHT FOR AUTOMOBILES.
APPLICATION FILED AUG. 6, 1915.
1,172,081.
Patented Feb. 15, 1916.
3 SHEETS—SHEET 1.
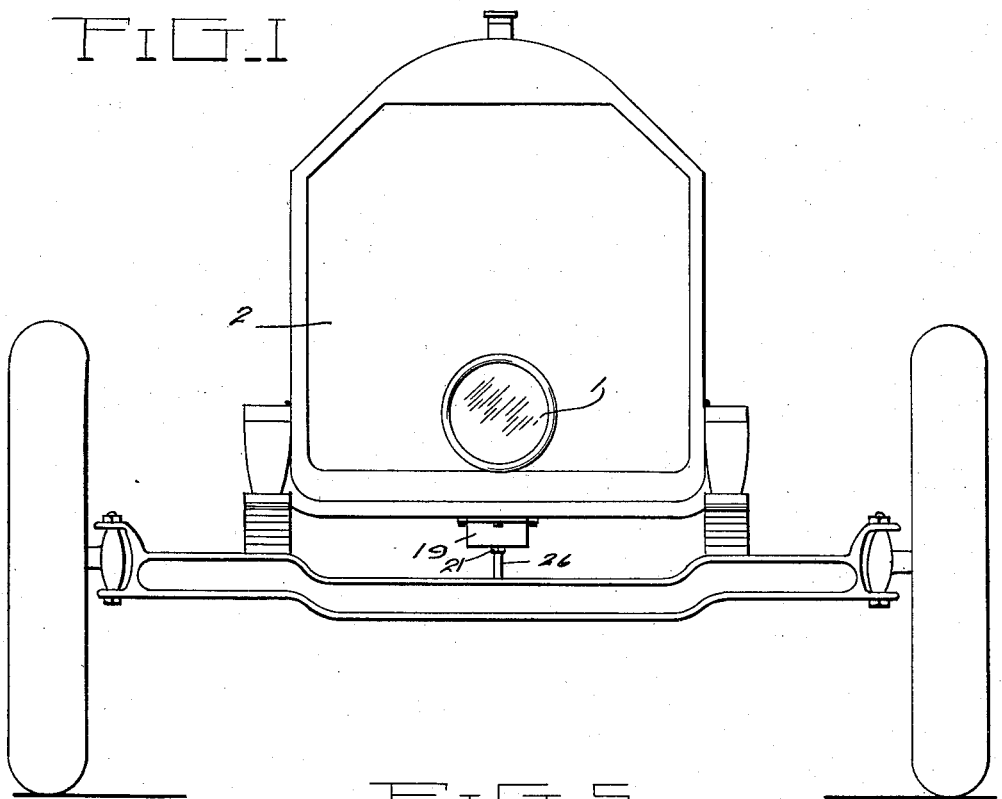
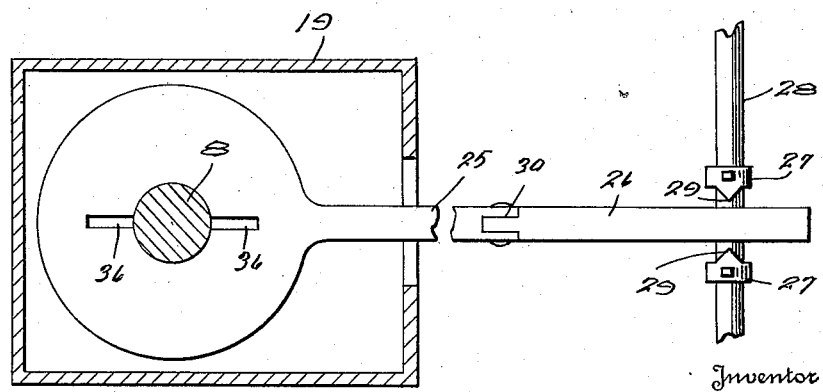
Witnesses
Chas. H. Trotter
H. F. Riley
Inventor
A. Wagner
By [signature], Attorney A. WAGNER.
DIRIGIBLE HEADLIGHT FOR AUTOMOBILES.
APPLICATION FILED AUG. 6, 1915.
1,172,081.
Patented Feb. 15, 1916.
3 SHEETS—SHEET 2.
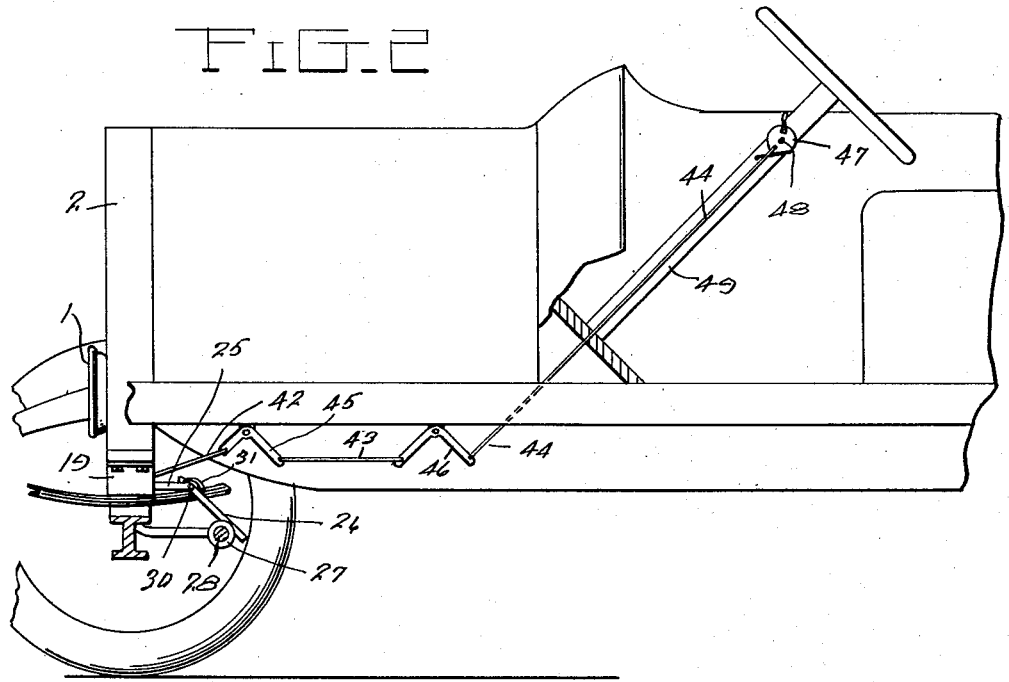
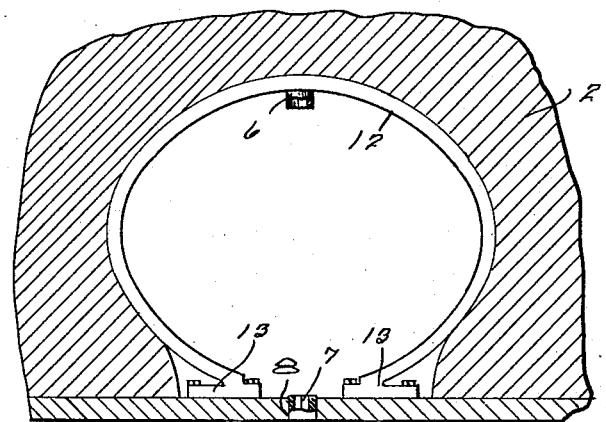
Witnesses
Chas. H. Tratte
H. T. Riley
Inventor
A. Wagner
By [signature]
Attorney A. WAGNER.
DIRIGIBLE HEADLIGHT FOR AUTOMOBILES.
APPLICATION FILED AUG. 6, 1915.
1,172,081.
Patented Feb. 15, 1916.
3 SHEETS—SHEET 3.
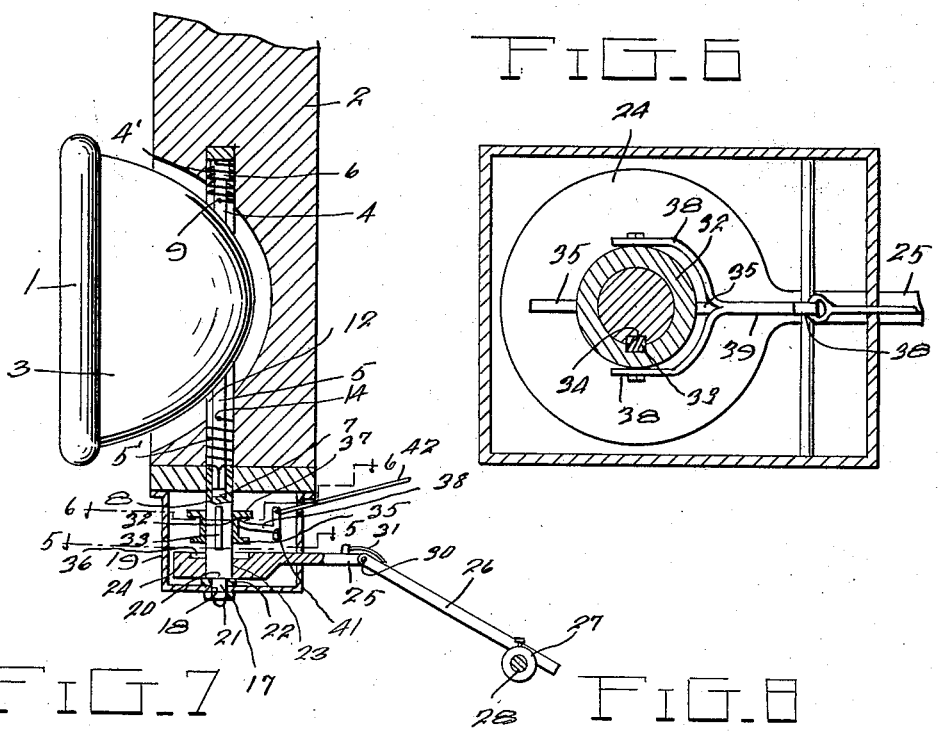

UNITED STATES PATENT OFFICE.

ALBERT WAGNER, OF LINCOLN, NEBRASKA.

DIRIGIBLE HEADLIGHT FOR AUTOMOBILES.

1,172,081.  Specification of Letters Patent.  Patented Feb. 15, 1916.

Application filed August 6, 1915. Serial No. 44,051.

*To all whom it may concern:*

Be it known that I, ALBERT WAGNER, subject of the Emperor of Germany, residing at Lincoln, in the county of Lancaster and State of Nebraska, have invented certain new and useful Improvements in Dirigible Headlights for Automobiles; and I do hereby declare the following to be a full, clear, and exact description of the invention, such as will enable others skilled in the art to which it appertains to make and use the same.

The invention relates to improvements in dirigible headlights for automobiles.

The object of the present invention is to improve the construction of dirigible headlights for automobiles and to provide a simple, practical, and comparatively inexpensive headlight of strong and durable construction operatively connected with the steering mechanism so as to throw the light in the direction in which the machine travels or the front wheels are turned and mounted in a sufficiently low position to prevent to a great extent a glaring light and obviate the necessity of employing a dimmer or dimming means and at the same time throw a powerful light directly on the ground without being obstructed by the fender or springs of the chassis.

A further object of the invention is to provide a dirigible headlight of this character equipped with means for enabling it to be easily operated at the steering wheel to connect it with and disconnect it from the steering mechanism of an automobile to enable it to respond to the movements of the said steering mechanism and also to remain stationary when desired.

It is also the object of the invention to provide cushioning means for permitting a limited vertical movement of the headlight to absorb shocks and vibrations so that a relatively steady light will be maintained and at the same time enable any character of lamp to be employed.

The invention also has for its object to enable the cushioning means to maintain the headlight steady in a central position until a positive turning movement is imparted to the steering mechanism whereby looseness of the parts and the slight weaving movement of the wheels will be prevented from vibrating the headlight and interfering with the steady character thereof.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a front elevation of a dirigible headlight constructed in accordance with this invention and shown applied to an automobile, Fig. 2 is a longitudinal sectional view of the same, Fig. 3 is an enlarged longitudinal sectional view illustrating the construction for detachably connecting the lower pivot of the headlight with the laterally movable arm or lever, Fig. 4 is an enlarged transverse sectional view illustrating the manner of mounting the headlight, Fig. 5 is a plan view of a portion of the mechanism for transmitting motion from the steering mechanism to the headlight, parts being in section, Fig. 6 is a horizontal sectional view on the line 6—6 of Fig. 3, Figs. 7 and 8 are detail views illustrating the arrangement of the upper and lower cushioning springs, Fig. 9 is a detail view of the cam rocking device for holding the connecting means in and out of operation.

Like numerals of reference designate corresponding parts in all the figures of the drawings.

In the accompanying drawing in which is illustrated the preferred embodiment of the invention, 1 designates a headlight preferably located centrally of the lower portion of the radiator 2 of an automobile and designed to be partially built into the same as shown, but it may be mounted in any other desired manner with relation to the automobile so as to be applied to the same in the manufacture thereof or mounted on any machine without requiring any special construction thereof.

The headlight which preferably consists of a reflector and a suitable lamp 3 is provided with upper and lower vertically alined pivots 4 and 5 and is cushioned in the vertical movement of the pivots in an upper bearing 6 and a socket 7 in a lower pivot section 8 into which the lower pivot 5 telescopes. The upper spring 4' which is of spiral form is disposed on the upper pivot and the tubular bearing 6 and its lower end 9 is suitably fixed to the reflector or other portion of the headlight. The upper end 10 of the spring 4' is extended into an arcuate slot 11 formed in the upper portion of a substantially elliptical frame or support 12 mounted upon the base of the radiator and having an opening in which the reflector operates. The lower ends of the sides of the frame or support 12 are provided with attaching portions 13 which are bolted or otherwise secured upon the base of the radiator or other suitable portion of the machine and the tubular bearing 6 which is open at the bottom depends from the top of the frame or support 12 at the center thereof. The lower spring 5' has its upper end 14 suitably fixed to the reflector or other portion of the headlight and its lower end 15 operates in an arcuate slot 16 formed in the base of the radiator or other portion of the machine and extending in the opposite direction from the slot 11. When the headlight is in its central position, the springs engage the inner end walls of the arcuate slot under a slight tension sufficient to maintain the headlight in such central position and prevent the headlight from being affected by the looseness or any looseness of the parts of the device or the weaving of the wheels and when the steering mechanism is operated to turn the machine in one direction one of the springs will be placed under tension while the outer end of the other will be carried from the inner end wall of its coacting slot. By this construction the springs operate to cushion the headlight in the vertical movement thereof and to maintain the headlight steady in a central position and prevent slight vibratory movement of the headlight without interfering with the steering of the machine.

The lower portion or section of the lower pivot extends below the radiator and has its lower end 17 mounted in an opening 18 of a casing 19 which is secured to and depends from the machine and is adapted to protect the parts from mud and other accumulation. The lower end 17 is reduced to form a shoulder 20 and is threaded for the reception of a nut 21. A washer 22 is arranged upon the bottom of the frame and receives the shoulder 20 to form a bearing for the lower end of the pivot 8. The telescoping portions of the pivot sections or portions 5 and 8 are interlocked so that when the lower pivot section is turned by the means hereinafter described, the headlight will respond to such movement. The lower portion or section 8 of the lower pivot extends through an opening 23 in the front enlarged end or head 24 of an arm or lever 25 extending rearwardly from the said lower pivot of the headlight and provided with a pivoted or hinged section 26 which is arranged between blocks 27 carried by the transversely movable rod or bar 28 of the steering mechanism of the automobile. The transverse rod or bar 28 which connects the steering knuckle moves transversely in the ordinary manner in the steering of the automobile and the blocks 27 which are secured to the rod or bar 28 by suitable fastening means are provided with inner tapered or wedge shaped portions 29 which engage the rear pivoted section 26 of the arm or lever at opposite sides thereof. The tapered or wedge shaped projecting portions of the blocks enable the steering mechanism to swing the arm or lever 25 without permitting the parts to bind and in practice the slots will be arranged a sufficient distance apart so that any weaving of the wheels will not be transmitted to the headlight. The pivot 30 which connects the rear section 26 of the arm or lever to the front or body portion thereof is arranged horizontally and a spring 31 which is mounted on the front or body portion of the arm or lever bears at its free end against the upper face of the rear section for holding the same in the space between the blocks 27. The pivotal connection between the parts provides for an adjustment and for a disconnection of the device from the steering mechanism at that point.

Mounted upon the lower section or portion 8 of the lower pivot is a sliding collar 32 interlocked with the said lower section 8 by a key or feather 33 operating in a vertical groove 34 and movable longitudinally thereof to carry horizontal projecting lugs 35 into and out of recesses 36 in the upper face of the head of the arm or lever 25, whereby the lower section 8 of the lower pivot is rigidly connected with the arm or lever 25 and is disconnected therefrom. The collar is provided at the top with a flange 37 and it is engaged below the flange by a fork 38 formed on one arm of an L-shaped lever 39 and adapted to lift the sliding collar by engaging beneath the flange 37. The collar is normally urged downwardly by a coiled spring 40 interposed between the bottom of the radiator or frame of the machine and the top of the collar. The L-shaped lever 39 which is fulcrumed at its angle at 41 has its other arm extended upwardly and it is connected by a series of rods 42, 43, and 44 and bell crank levers 45 and 46 with a cam 47 mounted on a pivot 48 of a staff 49 of the steering wheel and located adjacent to the same. The cam 47 which is provided with a suitable operating handle 51 is provided with angularly related faces 52 and coacts with a spring 53 also mounted on the staff or support 49 and adapted to engage either of the said faces for holding the cam against movement. The cam is adapted to be oscillated to raise and lower the forked arm of the L-shaped lever to disconnect the arm or lever 25 from the lower pivot of the headlight and to connect it therewith.

It will be seen that the dirigible headlight and the mechanism for operating the same are adapted to be readily applied to an automobile and that the operating mechanism is simple and compactly arranged and may be controlled from a point adjacent to the steering wheel without necessitating the chauffeur leaving his seat.

What is claimed is:—

1. The combination with an automobile of a dirigible headlight mounted on the automobile at the lower portion of the radiator thereof and provided with upper and lower pivots and having a limited vertical movement, coiled springs mounted on the said pivots for cushioning the headlight and means for connecting the headlight with the steering gear of the automobile.

2. The combination with supporting means provided with oppositely extending arcuate slots of a dirigible headlight pivotally mounted on a vertical axis, coiled springs connected with the headlight and having portions operating in the said slots and arranged to maintain the headlight normally in a central position and means for connecting the headlight with the steering mechanism of the automobile.

3. The combination with an automobile of a support or frame mounted thereon and provided with an upper tubular bearing or socket, a dirigible headlight provided with upper and lower pivots, the upper pivot being arranged in the said bearing or socket, a member having a socket receiving the lower pivot of the headlight, upper and lower springs for cushioning the headlight and means for connecting the said member with the steering gear of the automobile.

4. The combination with an automobile of a headlight mounted thereon and provided with a vertical pivot, an arm or lever extending from the pivot to the steering mechanism of the automobile, a device for interlocking the arm or lever with the pivot, and operating means connected with the said device, said operating mechanism including a cam located adjacent to the steering wheel and provided with opposite edges and a spring arranged to be engaged by the said edges for holding the cam against movement.

5. The combination with an automobile of a headlight mounted thereon and provided with a vertical pivot, an arm or lever extending from the pivot to the steering mechanism of the automobile, a collar slidably interlocked with the pivot and provided with means for engaging the arm or lever, a forked lever engaging the collar, a spring for urging the collar into engagement with the arm or lever, and operating mechanism connected with the said lever.

6. The combination with the steering mechanism of an automobile including a transversely movable rod of a dirigible headlight having a pivot, an arm or lever extending from the pivot to the said bar and connected therewith, said arm or lever being provided with a recess, a collar slidably interlocked with the pivot and provided with a lug for engaging the said recess and mechanism for moving the collar into and out of engagement with the said recess.

7. The combination with an automobile having a steering gear provided with a transversely movable bar, a casing mounted on the automobile beneath the radiator thereof, a dirigible headlight having a pivot extending into the said casing, an arm or lever provided with a head arranged within the casing and receiving the said pivot, said arm or lever extending to and connected with the said bar, and means located within the said casing for detachably interlocking the pivot with the arm or lever.

In testimony whereof I affix my signature in presence of two witnesses.

ALBERT WAGNER.

Witnesses:
E. A. COUTURE,
JOHN FAULHABER.

Copies of this patent may be obtained for five cents each, by addressing the "Commissioner of Patents, Washington, D. C."